Jan. 19, 1937.  J. F. WERDER  2,067,996
MACHINE FOR TESTING LUBRICANTS
Filed Dec. 1, 1933  2 Sheets-Sheet 1
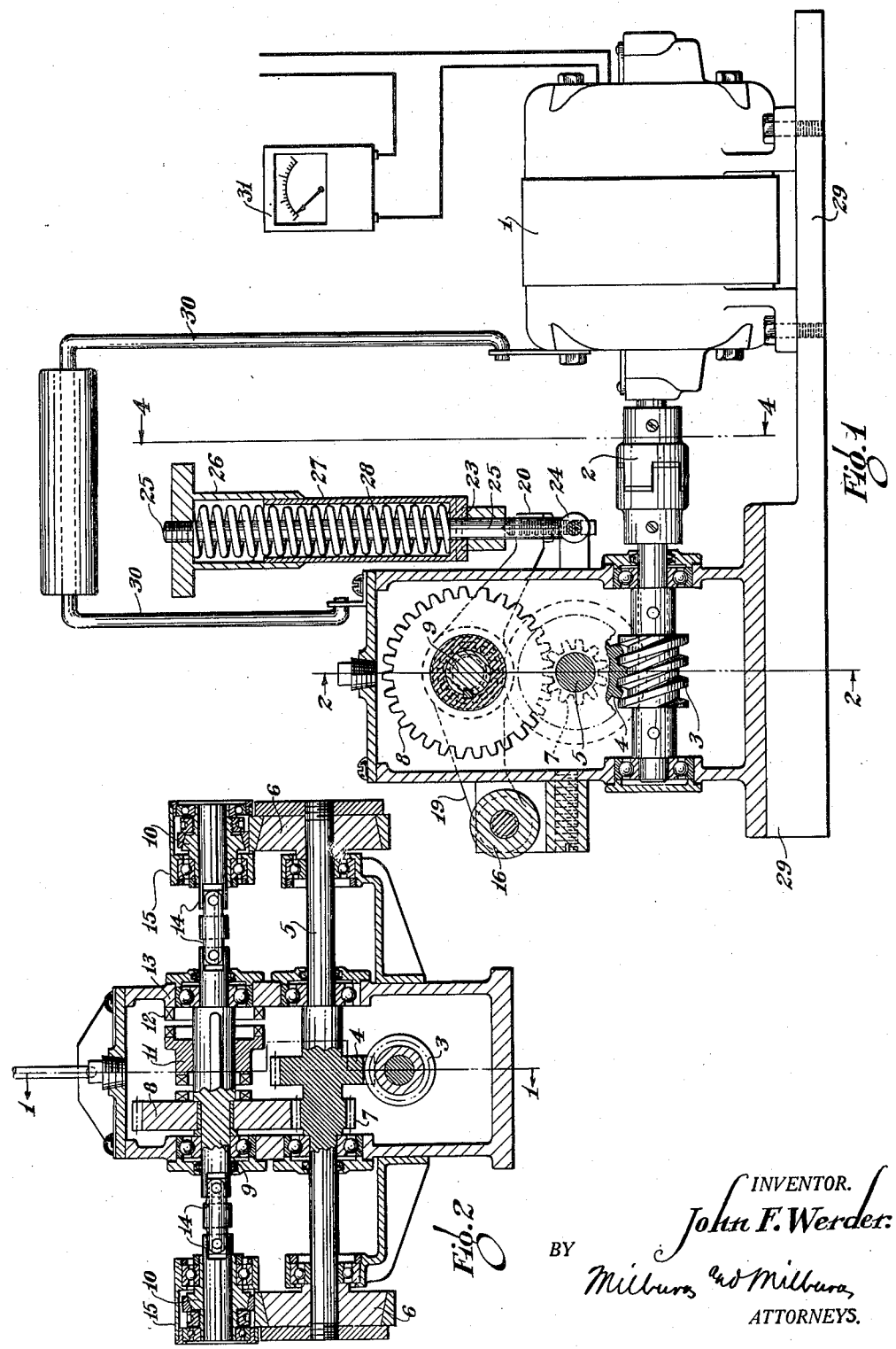
INVENTOR.
John F. Werder
BY Milburn and Milburn
ATTORNEYS.

Jan. 19, 1937.　　　J. F. WERDER　　　2,067,996
MACHINE FOR TESTING LUBRICANTS
Filed Dec. 1, 1933　　　2 Sheets-Sheet 2
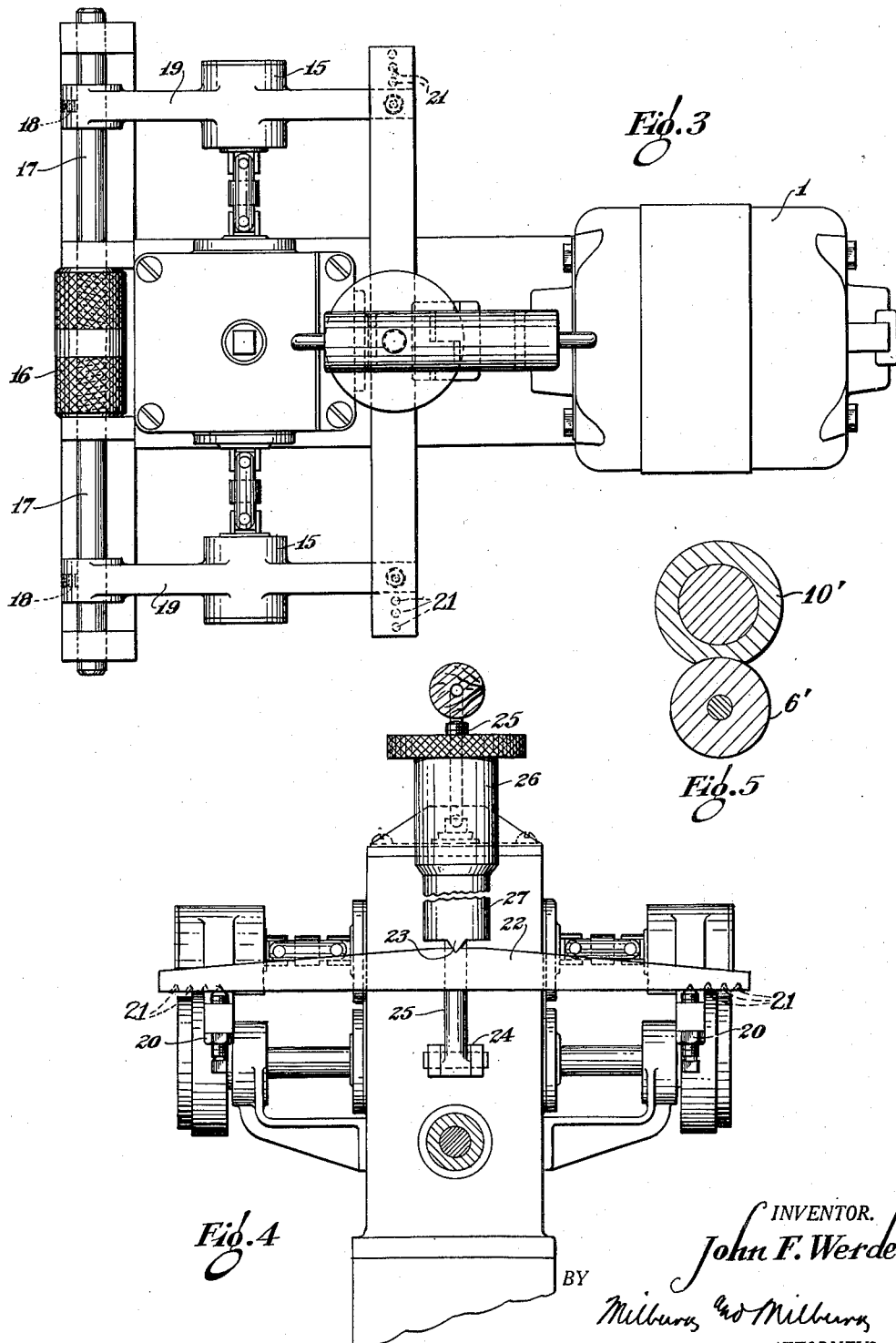

Patented Jan. 19, 1937

2,067,996

UNITED STATES PATENT OFFICE 2,067,996

MACHINE FOR TESTING LUBRICANTS

John F. Werder, Lakewood, Ohio, assignor of one-half to Edmund Rogers, South Euclid, Ohio Application December 1, 1933, Serial No. 700,626

23 Claims. (Cl. 265—10)

This invention relates to an improved form of device for testing and measuring the load-carrying and friction-relieving capacity of lubricants.

There have been previous forms of devices for this same general purpose, but for reasons which will later appear, they have not been altogether accurate and dependable and they have involved certain calculations which are unnecessary in my present device in ascertaining the true rating for the lubricant being treated.

One object of the present invention is to devise a machine by means of which a correct and dependable rating for the load-carrying capacity may be determined for a given lubricant, and in which the true rating may be ascertained directly and at once upon completion of the test.

Another object is to devise such a machine in which there may be performed comparative as well as positive, individual tests for a plurality of different lubricants.

A further object is to devise such a machine with a means of adjustment whereby both of the bearing elements between which the lubricant is tested may be rotated or only one of the bearing elements may be rotated while the other is held stationary.

A still further object is to devise such a machine with means for measuring and indicating the power required to operate the bearing element or elements at a given number of revolutions per minute under a given load and thereby ascertain the friction-relieving efficiency of the lubricant and any variation in this property throughout a given test.

This invention comprehends also the provision of certain structure and relative arrangement of parts so as to produce an efficient and dependable machine which at the same time can be operated in a convenient manner.

Other objects will appear from the following description and claims when considered together with the accompanying drawings.

Fig. 1 is a view of my machine, partly in side elevation and partly in section, this view being taken on line 1—1 of Fig. 2;

Fig. 2 is a view taken on line 2—2 of Fig. 1;

Fig. 3 is a plan view;

Fig. 4 is a view taken on line 4—4 of Fig. 1; and

Fig. 5 illustrates the use of the present invention for testing car oils.

The electric motor 1 which may be of the universal type, is adapted to drive the shaft 2 and the worm pinion 3 which is carried thereby and which meshes with gear 4 on shaft 5. Upon the opposite ends of shaft 5 there are fixedly mounted the bearing elements 6 and through the pinion 7 and gear 8 the shaft 5 is adapted to drive the parallel shaft 9 upon the ends of which are mounted the smaller bearing elements 10 which engage the lower larger bearing elements 6.

I prefer to use a universal motor because the speed of this type motor is inversely proportional to the load. Therefore, when a better lubricant is applied to the testing surfaces and the friction thereby reduced, a marked increase in speed is noted. If a constant speed type of motor is used, then any reduction in friction is indicated by the wattmeter.

The gear 8 is freely mounted upon shaft 9 and is adapted for engagement with clutch member 11 which is splined upon shaft 9. The opposite side of clutch member 11 is adapted to engage projections 12 on the stationary frame structure 13 within which the operating parts are suitably mounted. With this clutch mechanism, shaft 9 may be either rotated so as to cause rotation of the bearing elements 10, or shaft 9 and the bearing elements 10 may be held stationary while the gear 8 is rotated idly. A suitable adjusting lever may be provided for the clutch member 11.

Thus, when both bearing elements 6 and 10 are rotated, they will have different surface speeds. Whether the elements 6 and 10 are both rotated or element 10 held stationary, there will be relative surface movement between these elements.

The shafts 5 and 9 are mounted in ball bearings, as indicated in the drawings. Also, shaft 9 has universal connections 14 which permit the upper bearing elements to be raised out of engagement with the lower bearing portions for the purpose of applying thereto a specimen of the lubricant to be tested. The universal connections 14 have also other obvious advantages in operation of the device.

As indicated in the drawings, the lower bearing elements are wider than the upper ones, the idea being to move the upper bearing elements so as to engage fresh portions of the surface of the lower bearing elements for the successive tests, the upper bearing elements being replaced by new ones for each test when the upper elements are rotated. For instance, the lower bearing elements may be four times as wide as the upper bearing elements so as to serve for four tests, while four separate pairs of bearing elements will be placed in succession upon the upper shaft for as many successive tests.

For this purpose, the double bearings 15 in which the upper bearing elements are mounted are splined upon the shaft 9 so as to be adjustable therealong. This adjustment is effected by turning the nut 16 which is oppositely threaded at its two end portions which have threaded engagement with the ends of the rods 17 which in turn are connected at 18 with the arms 19 of the bearings 15 of the upper bearing elements. The outer ends of rods 17 are provided with suitable journal bearings in the frame structure in order to hold them in proper alignment. The other ends of the arms 19 are provided with pins 20, the upper ends of which have point engagement with the notches 21 on the under side of the bar 22. The middle part of bar 22 is adapted to be engaged by the lower knife-edge portions 23 of the adjustable load-applying member which is mounted at 24 in the frame of the machine. The upper end of the rod 25 which is mounted at 24 is engaged at its upper end by the nut member 26 which surrounds the tubular housing 27 within which the coil spring 28 is arranged about the rod 25. The lower end of spring 28 bears against the bottom of housing 27 and its upper end bears against nut member 26, so that upon screwing the nut member downwardly, the spring will be compressed and there will be caused an increase in the pressure of the ends of bar 22 upon the arms 19 and consequently there will be an increased pressure of the bearing elements 10 upon the bearing elements 6. Suitable calibration may be provided upon the barrel or housing 27 to be read at the edge of the member 26, so as to indicate the load applied.

The device as herein illustrated, is made of portable size and is mounted upon the base 29 upon which the structure is mounted. A bail form of handle 30 is also provided, by means of which the same may be conveniently handled.

As will be understood, the power required to operate the rotatable bearing element or elements at a given number of revolutions per minute, varies directly in accordance with the load applied to the bearing elements and indirectly with respect to the friction-relieving capacity of the lubricant, and with this in mind, I have inserted a wattmeter 31 in the circuit between the electric motor and the main line so as to thereby measure and indicate the power employed.

Also, since the friction-relieving property of a lubricant may possibly vary as the test proceeds, the wattmeter makes it possible to observe any such variations, since the power employed will vary inversely with respect to the friction-relieving property of the lubricant, as above stated.

If so desired, the wattmeter may be provided with a "graph" so as to make a continuous and permanent record of the power employed throughout the successive stages of the test.

For testing car oils, the brass shoe 10' is stationary and has its lower portion curved in accordance substantially with the curvature of the rotatable bearing element 6' with which the shoe is adapted to engage frictionally in the manner of a brake shoe of rolling stock.

One important feature of my device consists in the fact that the arms 19 are so constructed and arranged that the fulcrum of each arm 19 and the point of contact between the bearing elements, in each case, lie in a straight line which is tangent to the point of contact between the bearing elements. This is clearly indicated in Figs. 1 and 3. With this arrangement, the effect of the load applied is obtained at the point of contact between the bearing elements in a fuller, truer and hence more correct manner than would otherwise be the case. Consequently, no correction or computation is necessary in order to obtain a correct result as to the load-carrying capacity of the lubricant upon completion of the test, but the result is obtainable at once and in a direct manner. Also, with my device, there is obtained a result which is dependable as there is avoided any variable factor which would enter into the mathematical calculations which would otherwise be necessitated.

Also, in my present form of device, the point at which the load is applied is in a straight line with the point of fulcrum of the arms 19 and the point of contact between the bearing elements, as indicated in Fig. 1 of the drawings.

Although it is preferred to rotate the upper bearing elements as well as the lower bearing elements and at different surface speeds in the manner indicated, yet with my present device it is possible to maintain the upper bearing elements against rotation by adjustment of the clutch member 11, as above explained; in which case, the upper bearing elements may be moved to another position about the axis of shaft 9 so as to present fresh areas for successive tests. This may be done by moving the clutch member 11 to neutral position and then turning the shaft 9 with the bearing elements 10 carried thereby. The elements 10 will also be moved along their axis so as to engage fresh portions of the elements 6 as explained.

In actual use of my device, a film of the lubricant to be tested is applied to the surfaces of the bearing elements and the device is operated under a test load which is applied by adjusting the nut member 26. Access to the upper bearing elements for renewal or adjustment of the same, may be had by loosening the load-applying means and then raising the upper bearing elements as is permitted by the universal joints 14. Such adjustment of the upper bearing elements may also facilitate the application of the lubricant thereto preparatory to the test.

By virtue of the particular manner of mounting the upper bearing elements, including the double arrangement of ball bearings, there is precluded any danger of cocking of these bearing elements as the load is applied thereto, and there is thus obtained a proper engagement of the upper bearing elements with the lower ones.

As the load is gradually increased by the operator during any given test, the point at which the film strength fails can be determined at once by the change in the sound which is noticeable at once to the ear of the operator. Then by noting the load indicated upon the barrel 27, there is obtained a correct reading of the load-carrying capacity of the lubricant tested.

At the same time, the reading of the wattmeter at the instant of the breaking of the film of lubricant, will indicate the power required to overcome the friction between the bearing elements while being operated under load at a certain number of revolutions per minute. Also, as above explained, the wattmeter will indicate any variations in the friction-relieving capacity of a given lubricant throughout succeeding phases of the test to which it is being subjected.

With my duplex form of machine, it is possible to perform a comparative test between two different lubricants. That is, one lubricant can be tested between one pair of bearing elements, while another lubricant can be tested at the same time between the other pair of bearing elements. In this way, the two lubricants will be subjected to exactly the same test and it can easily be determined which of the lubricants is the first to break down under the load to which they are both subjected. Also, there can be obtained a positive reading as to the load-carrying capacity of the lubricant which is the first to break down and a similar reading can later be made as to the breaking point of the other lubricant as the test is continued with the remaining lubricant. Likewise readings can be obtained from the wattmeter as the test progresses.

What I claim is:

1. In a lubricant-testing machine, the combination of two metal elements between which the lubricant is tested, one of said elements being stationary and the other element being rotatable, means for exerting pressure towards bringing together said elements, the width of the bearing surface of one of said elements being a multiple of that of the other, the stationary element being rotatably and axially adjustable, whereby fresh portions of the wider element may be obtained for successive tests.

2. In a lubricant-testing machine, the combination of two metal elements between which the lubricant is tested, both of said elements being rotatable about parallel axes, means for rotating the same with relative surface speed therebetween, means for exerting pressure towards bringing together said elements, the width of the bearing surface of one of said elements being a multiple of that of the other, and said elements being capable of relative axial adjustment, whereby fresh portions of the wider element may be obtained for successive tests.

3. In a lubricant-testing machine, the combination of two metal elements between which a lubricating film is to be tested, both of said elements being movable, means for applying pressure to the elements and thus upon the film of lubricant being tested, means for effecting movement of said elements so as to have relative surface speed, and means for disconnecting one of said elements from its operating means and for holding the same stationary while in engagement with the other moving element.

4. In a lubricant-testing machine, the combination of two metal elements between which a lubricating film is to be tested, both of said elements being rotatable, means for applying pressure to the elements and thus upon the lubricating film, means for rotating said elements at different surface speeds, and means for disconnecting one of said elements from said rotating means and for holding the same stationary while in engagement with the other rotating element.

5. In a lubricant-testing machine, the combination of a plurality of sets of metal elements, each set comprising two elements between which the lubricant is tested, a single means for exerting pressure towards forcing together the elements of each set, both elements of each set being movable, and means for simultaneously and in a positive manner effecting the same rate of relative movement between the elements of each set and by the same motive means.

6. In a lubricant-testing machine, the combination of a plurality of sets of metal elements, each set comprising two elements between which the lubricant is tested, means for exerting pressure towards forcing together the elements of each set, both elements of each set being movable about parallel axes, and means for simultaneously effecting movement of the elements of each set at different rates of speed and the corresponding elements of all the sets at the same rate of speed and by the same motive means.

7. In a lubricant-testing machine, the combination of a plurality of sets of metal elements, each set comprising two elements between which the lubricant is tested, means for exerting pressure towards forcing together the elements of each set, both elements of each set being rotatable about parallel axes, and means for simultaneously effecting rotation of the elements of each set at different rates of speed and the corresponding elements of all the sets at the same rate of speed and by the same motive means.

8. In a lubricant-testing machine, the combination of a plurality of sets of metal elements, each set comprising two elements between which the lubricant is tested, one element of each set being stationary and the other element of each set being rotatable, a single means for rotating the rotatable elements simultaneously at the same rate of speed and by the same motive means, arm means pivotally mounted at one end and upon which one corresponding element of each set is mounted, and means for exerting pressure upon the other end of said arm means towards bringing together the elements of each set, the point of pivotal mounting of said means being in a line tangent to the point of pressure upon the film of lubricant between said elements.

9. In a lubricant-testing machine, the combination of a plurality of sets of metal elements, each set comprising two elements between which the lubricant is tested, both elements of each set being rotatable, means for simultaneously effecting the same rate of relative movement between the elements of each set and by the same motive means, arm means pivotally mounted at one end and upon which one corresponding element of each set is mounted, and means for exerting pressure upon the other end of said arm means towards bringing together the elements of each set, the point of pivotal mounting of said arm means being in a line tangent to the point of pressure upon the film of lubricant between said elements.

10. In a lubricant testing apparatus, a frame, two circular metal elements mounted thereon about parallel axes, means for driving one of said elements relative to the other element, means for applying a variable load upon said elements, the mounting for the fixed element including means permitting rotational adjustment of said fixed element to a fresh index point.

11. In a lubricant testing machine, a frame, two circular metal elements mounted thereon about parallel axes, means for driving one of said elements relative to the other element, the width of the driven element being a multiple of the fixed element, means for applying a variable load upon said elements, the mounting of the fixed element including means permitting rotational adjustment of said fixed element to a fresh index point, and means for lateral adjustment of the fixed element to secure engagement with a fresh portion of the rotating element.

12. In apparatus for testing lubricants, a frame, a pair of circular rubbing elements mounted thereon about parallel axes, means for selectively driving one or both of said elements, means for imposing a load upon said elements, one of said elements being of a width which is a multiple of the other and means for selectively adjusting the narrower element axially in increments at least equal to its width, to secure engagement of a fresh surface.

13. In a lubricant testing machine, the combination of a plurality of sets of metal elements, each set comprising two elements between which the lubricant is tested, means for exerting pressure towards forcing together the elements of each set, a universal motor and transmission means for selectively driving one or both elements of each set, and said means being adapted to simultaneously effect the same rate of relative movement between the elements of each set.

14. In a lubricant testing machine, the combination of a plurality of sets of metal elements, each set comprising two elements between which the lubricant is tested, a single means for exerting pressure towards forcing together the elements of each set, means for selectively driving one or both elements of each set and said means being adapted to simultaneously and in a positive manner effect the same rate of relative movement between the elements of each set and by the same motive means.

15. In a lubricant testing machine, a frame, two sets of metal elements, each set comprising two elements mounted thereon between which the lubricant is tested, means for exerting equal pressure towards forcing together the elements of each set, a universal motor and transmission means for driving one element of each set and said means being adapted to simultaneously effect the same rate of relative movement between the elements of each set.

16. In a lubricant testing apparatus, a frame, two circular metal elements mounted thereon about parallel axes, universal motor means for driving one of said elements relative to the other element, means for applying a variable load upon said elements, the mounting for the fixed element including means permitting rotational adjustment of said fixed element to a fresh index point.

17. In a lubricant testing machine, a frame, two circular metal elements mounted thereon about parallel axes, universal motor means for driving one of said elements relative to the other element, the width of the driven element being a multiple of the fixed element, the mounting of the fixed element including means permitting rotational adjustment of said fixed element to a fresh index point, and means for lateral adjustment of the fixed element to secure engagement with a fresh portion of the rotating element.

18. In a lubricant testing apparatus, a frame, two sets of two circular metal elements mounted thereon about parallel axes, means for driving one element of each set relatively to the other element of each set, common means for applying a variable load equally upon the elements of both sets so as to subject the lubricant used on each set to identical loads.

19. In a lubricant testing apparatus, a frame, two sets of two circular metal elements mounted thereon about parallel axes, means for driving one element of each set relatively to the other element of each set, means for applying a variable load equally upon the elements of both sets, the mountings for the fixed elements of each set including means permitting rotational adjustment of said fixed elements to a fresh index point.

20. In a lubricant testing machine, a frame, two sets of two circular metal elements mounted thereon about parallel axes, means for driving one element of each set relative to the other element, the width of the driven elements being a multiple of the fixed element, means for applying a variable load equally upon the elements of both sets, the mountings of the fixed elements including means permitting rotational adjustment of said fixed elements to fresh index points, and means for lateral adjustment of the fixed elements to secure engagement with fresh portions of the rotating elements.

21. In apparatus for testing lubricants, a frame, a pair of circular rubbing elements mounted thereon about parallel axes, means for driving one of said elements, means for imposing a load upon said elements, the driven element being of a width which is a multiple of the fixed element and means for selectively adjusting the narrower element axially in increments at least equal to its width, to secure engagement of a fresh surface.

22. In a lubricant testing machine, the combination of a plurality of sets of metal elements, each set comprising two elements between which the lubricant is tested, common means for exerting pressure towards forcing together the elements of each set, a universal motor and transmission means for simultaneously driving one element of each set, and said means being adapted to simultaneously effect the same rate of relative movement between the elements of each set.

23. In a lubricant testing machine, the combination of a plurality of sets of metal elements, each set comprising two elements between which the lubricant is tested, a single means for exerting pressure towards forcing together the elements of each set, means for driving one element of each set and said means being adapted to simultaneously and in a positive manner effect the same rate of relative movement between the elements of each set and by the same motive means.

JOHN F. WERDER.